3,666,630
PRODUCTION OF TREMORTINS A, B, AND C
Alex Ciegler and Ching Tsang Hou, Peoria, Ill., assignors to the United States of America as represented by the Secretary of Agriculture
Filed May 4, 1970, Ser. No. 34,390
Int. Cl. C12d 7/00
U.S. Cl. 195—81
2 Claims

ABSTRACT OF THE DISCLOSURE

Tremortins A, B, and C are produced in high yield by culturing certain fungi, namely, *Penicillium palitans, P. crustosum, P. granulatum, P. cyclopium, P. puberulum, P. olivino-viride,* or *P. martensii*.

---

Figure 1:
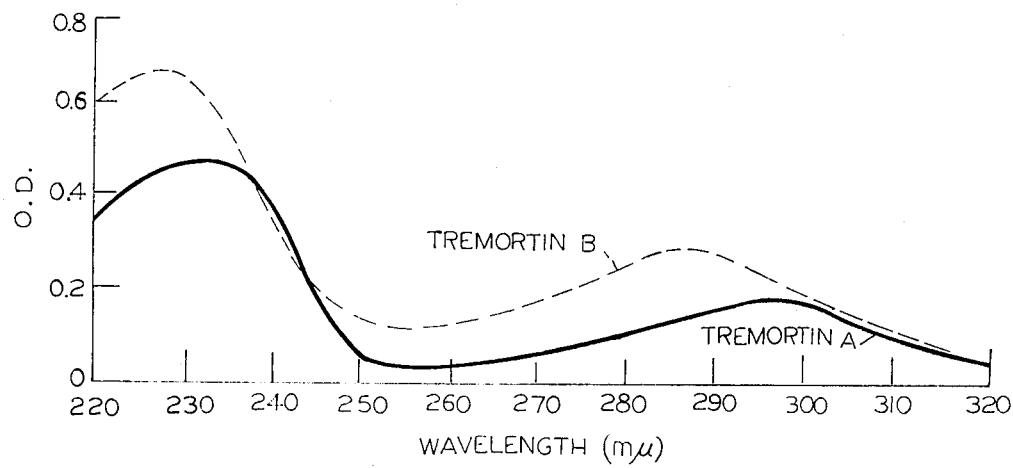
Figure 2:
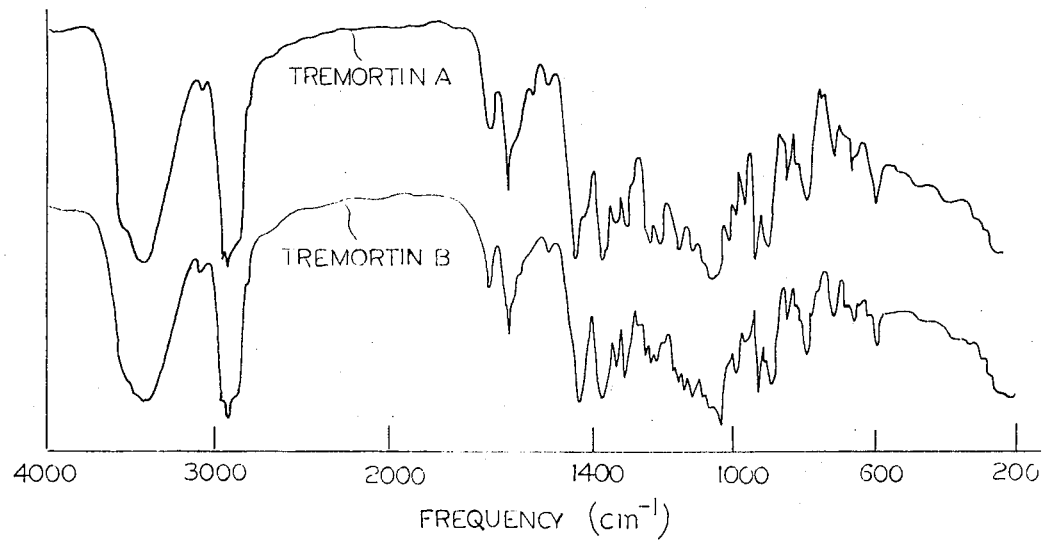

A nonexclusive, irrevocable, royalty-free license in the invention herein described, throughout the world for all purposes of the United States Government, with the power to grant sublicenses for such purposes, is hereby granted to the Government of the United States of America.

DESCRIPTION OF THE INVENTION

This invention relates to the production of a group of tremorgenic toxins (tremortins A, B, and C), and has for its prime object the provision of processes for production and isolation of these said tremorgens. Further objects of the invention will be evident from the following description wherein parts and percentages are by weight unless otherwise specified.

Tremorgens are compounds which have the ability of eliciting a sustained trembling, convulsions, and eventually death in various rodents. Because of this ability, the tremortins may be employed as rodenticides for the control of various and select rodents such as mice and rats. In recent years the problem of rodent control has become more acute because of inadequate disposal of wastes, particularly in large cities, and because of the use of waste disposal units in individual homes which have the effect of flooding waste disposal lines and sewage lines with food materials that support the growth of rodents such as rats in these systems. Additional measures are required for rodent control that act rapidly and effectively.

Because the tremortins appear to affect the central nervous system as well as various muscles, these compounds may also find application pharmacologically in treatment of diseases affecting these tissues, e.g., Parkinson's disease and heart attacks.

A primary object of the invention is to provide the means for remedying the aforesaid problem. We have found that certain fungi produce compounds that are highly effective in very low doses as rodenticides.

Another object of the invention is the provision of means of recovery and purification of the tremorgens from various Penicillium species.

The fungi used in accordance with the invention and which provides desirable high yields of the desired tremorgens are *Penicillium palitans, P. crustosum, P. granulatum, P. cyclopium, P. puberulum, P. olivino-viride,* and *P. martensii*. Various strains of these organisms may be employed. The preferred strains in the case of the first-named fungus are NRRL 3468, 1164, 966, 2033; in the case of the second-named fungus, NRRL 968, 1983, A–679, A–1413, A–944, A–2217; in the case of the third-named fungus, NRRL 2036, 1575, A–3334, A–3436; in the case of the fourth-named fungus, NRRL 3476, 3477; in the case of the fifth-named fungus, NRRL 1889; in the case of the sixth-named fungus, NRRL 958, 959, 2028; in the case of the seventh-named fungus, NRRL 2034. Cultures of these organisms have been deposited in the Stock Culture Collection of the U.S. Department of Agriculture, Northern Regional Research Laboratory, Peoria, Ill., from which organization samples of these strains may be obtained.

In a practice of the invention the bacteria are cultured under aerobic conditions in a conventional nutrient medium that has been supplemented with a vitamin source. As well understood in the art, the medium will contain as assimilable carbon source and an assimilable nitrogen source.

The assimilable carbon source may be, for example, a carbohydrate such as glucose, fructose, sucrose, mannose, lactose, beet or cane molasses, and the like. Of these, fructose or glucose is preferred and is generally used in a concentration of about 3 percent.

The assimilable nitrogen source may be, for example, meat extracts or hydrolysates, soybean meal, distillers dried solubles, casein or casamino acids, amino acids, ammonium nitrate or sodium nitrate, and the like. Of these, casamino acids are preferred and are generally used at a concentration of about 0.3 percent.

The assimilable vitamin source may be, for example, yeast extracts or hydrolysates, corn steep liquor, or distillers dried solubles. Of these, corn steep liquor is generally preferred.

The nutrient medium may also certain the usual nutrient salts such as dipotassium phosphate, magnesium sulfate, potassium chloride, and ferrous sulfate. No special pains need be taken with regard to trace minerals—these are normally provided by the inorganic substances present as normal impurities in the various components of the medium, for example, in the carbon, nitrogen, and vitamin sources and in the diluent (ordinary tap water).

During the fermentation it is not necessary to control the pH. Generally, the pH of the medium is about 4.1 at the start of the fermentation, and no attempt is made to keep it at this level during the course of the fermentation, during which it generally increases to about 8.2.

The temperature of the fermentation may be that conventional in culturing fungi, and is preferably from about 15° C. to about 30° C.

The fermentation may be carried out in typical laboratory flasks or for larger operations, in trays. Submerged, aerated conditions as exist in typical fermentation tanks is generally detrimental to tremorgen production.

The tremorgenic compounds, tremortins A, B, and C, are generally associated with the cell material as opposed to the broth. For this reason, a preliminary step in recovery of the product will involve a treatment such as filtration or decantation to separate out the cellular material. Various procedures may be used to recover the tremortins and purify them. This may involve a preliminary dessication of the mycelium by a warm air stream or by vacuum followed by extraction using any one of various solvents such as diethyl ether, acetone, methanol, chloroform, or combinations of these solvents. Alternately, the wet cellular mass may be extracted using a blending process with solvents or mixtures of solvents such as methanol, acetone, or chloroform. After either extraction procedure, the solvent solution may be concentrated to dryness by any one of a number of procedures including a warm air stream or vacuum. The residual solids are then generally dissolved in a small volume of solvent such as chloroform and chromatographed on a column containing a partitioning material such as silica gel or Florisil. This column was washed with a solvent such as chloroform followed by a wash of chloroform containing various amounts of a more polar solvent such as methanol or acetone which eluted the tremortins. This preliminary column separates out foreign substances such as pigments and gums. The solvent fraction containing the tremortins was partitioned on a second column containing the same partitioning material as the first column, for example, silica gel or Florisil. The second column was washed with a nonpolar solvent such as diethyl ether in petroleum ether followed by a gradient elution in which the concentration of the diethyl ether was gradually increased. The mixtures of tremortins in the solvent eluates were further resolved on a third column containing a gel such as Sephadex LH–20. This column was washed with a polar solvent such as acetone. This column effectively separated the three tremortins (A, B, C) which could then be collected as feathery white crystals upon evaporation of the solvent. To test the effectiveness of these compounds as a rodenitcide, small amounts of the tremortin crystals were dissolved in a solvent such as propylene glycol or dimethyl sulfoxide and a small volume injected into a rodent which was then observed for symptoms of trembling, convulsions, and death. Alternately, the purified tremortins or the dry cell mass containing the tremortins prior to solvent extraction could be mixed into a feed attractive to the rodent and then fed to the animal which could then be observed for signs of trembling, convulsions, and death.

The invention is further demonstrated by the following illustrative examples.

EXAMPLE 1

A basal medium having the following composition was prepared:

| | G. |
|---|---|
| Sucrose | 30 |
| Sodium nitrate | 3 |
| Dipotassium phosphate | 1 |
| Magnesium sulfate | 0.5 |
| Potassium chloride | 0.5 |
| Ferrous sulfate | 0.01 |
| Yeast extract or corn steep liquor [1] | |
| Tap water, sufficient to make 1,000 ml. | |

[1] Varied as noted in Table I.

Five-hundred ml. aliquots of the medium were placed in a series of 2,800-ml. conical flasks which were plugged, sterilized, and cooled.

Each flask was inoculated with spores of *Penicillium palitans* NRRL 3468 from an agar slant. The flasks were incubated without agitation at 28° C. for 10 days. The mycelial growth was then assayed for total tremortin content by the following procedure:

Assay: The mycelial growth from each flask was blended with a given volume of chloroform:methanol (70:30 v./v.) for 3 minutes in a Waring-type Blendor. This homogenate was centrifuged to separate out the organic solvent which was removed, dried with anhydrous sodium sulfate, and a small aliquot containing between 2.5 to 30 μg. tremortins, as determined by trial and error, transferred to a small test tube, and the solvent evaporated by moving air. Methanol (0.5 ml.) and concentrated sulfuric acid were then added to the tube, a glass ball placed on top, and the tube heated in a 70° C. water bath for 15 minutes. The resulting blue-colored reaction mixture was transferred to a 1-ml. volumetric flask and the volume adjusted to 1 ml. with methanol. The color intensity was measured in a spectrophotometer at 630 mμ. The amount of tremortin present was calculated from a standard curve prepared by using purified tremortin. A linear response was obtained between 2.5 to 30 μg. termortin. The yields of tremortins are shown in the following table.

TABLE I

| Basal medium supplemented with— | Percent | Tremortins, mg./500 ml. medium |
|---|---|---|
| Yeast extract | 0 | 2.5 |
| | 0.1 | 8.7 |
| | 0.5 | 27.0 |
| | 1.0 | 26.5 |
| | 3.0 | 14.7 |
| | 5.0 | 10.0 |
| Corn steep liquor | 0.5 | 32.5 |
| | 1.0 | 37.0 |
| | 3.0 | 38.0 |
| | 5.0 | 32.0 |

EXAMPLE 2

The experiment of example was repeated with *Penicillium palitans* NRRL 3468; however, 0.5 percent yeast extract was added to the basal medium and various carbohydrates at a weight concentration of 3 percent (w./v.) substituted for the sucrose in the basal medium. The yields of tremortins are shown in the following table.

TABLE II

| Carbohydrates in the basal medium: | Tremortin yield mg./500 ml. medium |
|---|---|
| No sugar | 0.0 |
| Sucrose | 12.5 |
| Glucose | 19.5 |
| Fructose | 25.8 |
| Mammose | 18.5 |
| Sorbitol | 8.5 |
| Lactose | 14.5 |
| Starch | 5.5 |
| Glycerol | 1.5 |
| Galactose | 6.5 |
| Maltose | 4.0 |

EXAMPLE 3

The experiment of Example 1 was repeated with *Penicillium palitans* NRRL 3468; however, the basal medium was supplemented with 0.5 percent yeast extract (w./v.) and the sodium nitrate replaced with 0.3 percent (w./v.) of other nitrogenous sources. The yields of tremortins are shown in the following table.

TABLE III

| Nitrogen source: | Tremortin yield mg./500 ml. medium |
|---|---|
| None | 7.0 |
| Ammonium sulfate | 0.0 |
| Ammonium nitrate | 10.0 |
| Casamino acids | 22.7 |
| L-glutamate | 14.0 |
| Peptone | 19.5 |
| Sodium nitrate | 12.5 |

EXAMPLE 4

The experiment of Example 1 was repeated using the basal medium supplemented with 0.5 percent (v./v.) corn steep liquor; however, the following fungi were used in place of *Penicillium palitans* NRRL 3468:

| Fungus: | NRRL No. |
|---|---|
| *Penicillium palitans* | 1164, 966, 2033. |
| *P. crustosum* | 968, 1983, A–679, A–1413, A–944, A–2217. |
| *P. granulatum* | 2036, 1575, A–3334, A–3436. |
| *P. cyclopium* | 3476, 3477. |
| *P. puberulum* | 1889. |
| *P. olivino-viride* | 958, 959, 2028. |
| *P. martensii* | 2034. |

Aliquots of the chloroform:methanol (70:30 v./v.) extracts of the mycelial growth were spotted onto 9 x 9 inch thin-layer chromatographic plates coated with a 25-mm. thickness of absorbent of silica gel G-HR. In addition, aliquots of pure tremortins were also applied to the plates. The spotted plates were developed in the following solvent: chloroform:acetone, 93:7 (v./v.) until the solvent front reached almost to the top of the plates. The plates were air dried, sprayed with a 1-percent solution of $FeCl_3$ in butanol, and gently warmed. Areas containing tremortins A, B, or C developed a green to blue-green color with an $R_f$ characteristic for each tremortin, All of the fungus cultures listed in this example produced the tremortins.

EXAMPLE 5

Purification: Fifteen 2,800-ml. conical flakes, each containing 500 ml. of the basal medium of Example 1 supplemented with 2 percent (v./v.) corn steep liquor was inoculated with spores of *P. palitans* NRRL 3468 and incubated without agitation for 11 days at 28° C. The fungal growth from these flasks was recovered by filtration through cheesecloth, pooled, and extracted in a 1-gallon size Waring Blendor with chloroform: methanol (70:30, v./v.) using approximately 2–3 liters of solvent; several extractions were made of the solids and the solvent extracts pooled. Water was removed from the solvent extract by use of anhydrous sodium sulfate. The extract was evaporated to dryness by flash evaporation and the residue redissolved in a small volume of chloroform (50 to 100 ml.) and applied to a 4.3 x 35 cm. Florisil (60–100 mesh) column presaturated with chloroform. The column was washed with 250 ml. of chloroform to remove a yellowish pigment. The tremortins were eluted from the column by 500 ml. of 3 percent methanol in chloroform. This "preliminary" column separated the tremortins from a yellowish pigment and most of the gum-like substances present. The tremortin fraction from this preliminary column was evaporated to dryness. The residues were suspended in a small volume of 25 percent diethyl ether in petroleum ether and applied to a 2.4 x 45 cm. Florisil column (100–200 mesh) presaturated with the same solvent. After washing with 300 ml. of 25 percent diethyl ether in petroleum ether, the column was eluted gradiently by increasing the diethyl ether concentration. For gradient elution, 600 ml. each of 30 and 70 percent diethyl ether in petroleum ether were used. The flow rate of the column was 3 ml. per minute and 11-ml. fractions were collected. Tremortins were collected in fractions 27 to 70. Mixtures of tremortins B and A and tremortins A and C were obtained in fractions 27 to 42 and 49 to 60, respectively. The fractions containing the mixture of tremortins A plus B from two 15-flask fermentations were evaporated to dryness and the residues dissolved in 5 ml. acetone and applied to a 2.4 x 200 cm. column containing Sephadex LH–20 presaturated with acetone. The column was eluted with acetone (flow rate of 1.4 ml. per minute) and 5-ml. fractions were collected. Pure tremortins B and A were obtained in fractions 123 to 139 and 142 to 167, respectively. The solvent solutions of each fraction were pooled separately and the solvent permitted to evaporate slowly at room temperature (about 25° C.).

Fractions containing mixtures of tremortins A plus C obtained from Florisil column chromatography were also purified further by gel filtration on a Sephadex LH–20 column using acetone as solvent. Pure tremortin C was obtained in tubes 130 to 140.

Some properties of the tremortins: Both tremortins A and B are white crystals. They are soluble in diethyl ether, chloroform, acetone, methanol, and some other polar solvents, have limited solubility in water and in 5 percent concentrations of both hydrochloric acid and sodium hydroxide. Both tremortins are rapidly degraded to form a yellowish, progressing through green, and then to blue solution when dissolved in alcohols or acetone and treated with various dilute acids. These changes are concurrent with loss of toxicity. Purified tremortins are unstable in chloroform when exposed directly to the light. This is presumably a result of acid formation in the solvent.

Tremortin A decomposes gradually between 210° and 230° C., changing color from white to dark brown without melting. Tremortin B decomposes in a similar manner between 185° and 195° C.

Both tremortins give a positive Lieberman-Burchard reaction, but neither is precipitated with digitonine. No amino acids or sugars can be detected in the acid hydrolyzate of either compound.

The ultraviolet absorption spectra of tremortins A and B are shown in FIG. 1. Tremortin A has peaks at 295 and 233 $m\mu$. Tremortin B has a broad absorption from 270 to 300 $m\mu$ with a single peak at 286 $m\mu$ and a peak at 227 $m\mu$.

The infrared spectra of the tremortins were compared using KBr pellets and are shown in FIG. 2. As can be seen in FIG. 2, the infrared spectra of both tremortins look very similar indicating that both tremortins have the same functional group.

EXAMPLE 6

The experiment in Example 5 was repeated; however, fungal growth was air dried and extracted by diethyl ether. About 60 percent of the tremortins were extracted based on yields recoverable from the use of chloroform: methanol (70:30, v./v.) and wet fungal growth. However, the use of dry fungal growth and an ether extract permitted elimination of the "preliminary" Florisil column of Example 5 and the diethyl ether extract could be applied directly to the second Florisil for purification purposes.

EXAMPLE 7

Rodenticide properties: Propylene glycol (0.05 ml.) containing 25 $\mu$g. of tremortin A or 132 $\mu$g. of tremortin B were injected intraperitoneally into 20-g. mice for the $LD_{50}$ determination. Thirteen mice were injected with tremortin A. All of the mice showed onset of tremors at 10 to 15 minutes after injection, and six of them died in 24 hours. Another group of 14 mice were injected with tremortin B. After trembling, seven of them were found dead in 24 hours. Therefore, the $LD_{50}$ of tremortins A and B are 1.2 and 5.0 mg./kg. mice, respectively. Tremortin C is less toxic than tremortins A and B, 900-$\mu$g. doses being required to elicit a trembling response. For oral administration, tremortin A (2 mg.) was homogenized with granulated Wayne Lab-Blox (685 mg.) and fed to 20-g. mice. The mice died 5 hours after eating 21 mg. of the mixture (60 $\mu$g. tremortin). A similar experiment in which tremortin B was added to rodent feed resulted in death in 1 hour after the animals ate 120 mg. feed containing 4 mg. tremortion B.

We claim:

1. A process for preparing tremortins A, B, and C which comprises culturing *Penicillium palitans* on a nutrient medium under aerobic conditions and recovering from the culture, tremortins A, B, and C, each of which is free from the others.

2. The process of claim 1 wherein the *Penicillium palitans* is NRRL 3468.

References Cited

Wilson et al.: Tremorgenic Toxin from Penicillium Cyclopium Grown on Food Materials, Nature, vol. 220, Oct. 5, 1968, pp. 77–78.

Chem. Abstracts, vol. 54, 1960, 22821g.

Chem. Abstracts, vol. 66, 1967, 114042h.

JOSEPH M. GOLIAN, Primary Examiner

U.S. Cl. X.R.

425—115